(12) United States Patent
Rashinkar

(10) Patent No.: US 12,485,845 B1
(45) Date of Patent: Dec. 2, 2025

(54) VEHICLE INTERIOR PANEL FOR USE OVER A DEPLOYABLE AIRBAG

(71) Applicant: Faurecia Interior Systems, Inc., Auburn Hills, MI (US)

(72) Inventor: Prashant Rashinkar, Rochester Hills, MI (US)

(73) Assignee: FAURECIA INTERIOR SYSTEMS, INC., Auburn Hills, MI (US)

( * ) Notice: Subject to any disclaimer, the term of this patent is extended or adjusted under 35 U.S.C. 154(b) by 0 days.

(21) Appl. No.: 18/676,944

(22) Filed: May 29, 2024

(51) Int. Cl.
 *B60R 21/2165* (2011.01)
(52) U.S. Cl.
 CPC .................. *B60R 21/2165* (2013.01)
(58) Field of Classification Search
 CPC .................................................. B60R 21/2165
 See application file for complete search history.

(56) References Cited

U.S. PATENT DOCUMENTS

| | | | | |
|---|---|---|---|---|
| 7,093,849 B2 * | 8/2006 | Nishijima | ............... | B32B 27/32 280/732 |
| 7,490,850 B2 * | 2/2009 | Kanno | ............... | B60R 21/2165 280/732 |
| 12,024,113 B2 * | 7/2024 | Kobayashi | .......... | B60R 21/2165 |

FOREIGN PATENT DOCUMENTS

| | | | | |
|---|---|---|---|---|
| CN | 213354415 U | * | 6/2021 | ......... B60R 21/2165 |
| EP | 1975014 A2 | | 10/2008 | |
| FR | 3104511 A1 | * | 6/2021 | ........... B60R 21/215 |

OTHER PUBLICATIONS

FR-3104511-A1 Machine English Translation (Year: 2021).*
CN-213354415-U Machine English Translation (Year: 2021).*

* cited by examiner

*Primary Examiner* — Jason D Shanske
*Assistant Examiner* — Matthew James O'Neill
(74) *Attorney, Agent, or Firm* — Reising Ethington P.C.

(57) ABSTRACT

A vehicle interior panel for use over a deployable airbag includes a hinge region with particular thickness profiles to help promote door rotation. The panel includes a substrate comprising a door and an outer perimeter at least partially surrounding the door, with the hinge region having two curved portions spanning at least partially between the door and the outer perimeter. The hinge region has a flatter portion located at least partially between the two curved portions, the flatter portion having a first thickness zone having a first thickness coupled to the outer perimeter and a second thickness zone having a second thickness located between the first thickness zone and the door. The second thickness is greater than the first thickness.

16 Claims, 3 Drawing Sheets

VEHICLE INTERIOR PANEL FOR USE OVER A DEPLOYABLE AIRBAG

TECHNICAL FIELD

The present disclosure is related generally to vehicle interior panels and, more particularly, to vehicle interior panels through which an airbag can deploy.

BACKGROUND

Airbags are commonly employed safety devices in vehicle interiors, but their presence is often entirely unknown to vehicle occupants until deployed in the event of a relatively severe collision. The design of the hinge region can impact deployment performance. Accordingly, optimizing the design of the hinge is beneficial. In one example, FR 3104511 to Perinet and Rashinkar teaches varying the thicknesses at the hinge region. Further developments to this design to change the thickness profile have proved beneficial in optimizing deployment by unexpectedly minimizing door translation during rotation.

SUMMARY

An illustrative vehicle interior panel for use over a deployable airbag includes a substrate comprising a door and an outer perimeter at least partially surrounding the door. A hinge region is located at least partially between the door and the outer perimeter. The hinge region comprises two curved portions spanning at least partially between the door and the outer perimeter, and a flatter portion located at least partially between the two curved portions, the flatter portion having a first thickness zone having a first thickness coupled to the outer perimeter and a second thickness zone having a second thickness located between the first thickness zone and the door. The second thickness is greater than the first thickness.

In various embodiments, the panel comprises a chute wall extending from an edge of the outer perimeter.

In various embodiments, the first thickness zone is directly adjacent the chute wall.

In various embodiments, the door is configured to rotate directly at the chute wall.

In various embodiments, the flatter portion and the chute wall minimize linear translation of the door during deployment.

In various embodiments, at least one of the curved portions includes a first thickness zone having a first thickness and a second thickness zone having a second thickness, with the first thickness being greater than the second thickness.

In various embodiments, the first thickness zone of the flatter portion and the first thickness zone of the at least one curved portion are directly adjacent a chute wall.

In various embodiments, the second thickness zone has a raised rib.

In various embodiments, one or more sides of the raised rib have a draft angle that is sloped toward a tear seam of the door.

In various embodiments, a ratio of the first thickness of the flatter portion to the second thickness of the flatter portion is between 1:1.3 and 1:4.5, inclusive.

In various embodiments, the flatter portion includes an intermediate zone having an intermediate thickness, with the intermediate thickness being greater than a thickness directly adjacent to the raised rib and less than the second thickness at the raised rib.

In various embodiments, the first thickness is less than the intermediate thickness and the thickness directly adjacent to the raised rib.

In various embodiments, a ratio of the first thickness of the flatter portion to the second thickness of the flatter portion is 1:1.3 or more.

In various embodiments, the ratio is 1:4.5 or less.

In various embodiments, the flatter portion has a reinforcement weld at the first thickness zone.

It is contemplated than any of the above-listed features can be combined with any other feature or features of the above-described embodiments or the features described below and/or depicted in the drawings, except where there is an incompatibility of features.

BRIEF DESCRIPTION OF THE DRAWINGS

Illustrative embodiments will hereinafter be described in conjunction with the following figures, wherein like numerals denote like elements, and wherein.

DESCRIPTION OF ILLUSTRATIVE EMBODIMENTS

Described herein is a vehicle interior panel configured to advantageously manage door movement during airbag deployment. The hinge region of each door includes a particular configuration of alternating curved and flatter portions that have better optimized thickness variations to improve deployment performance. More particularly, these thickness variations and the locations of the thickness variations relative to other components of the vehicle interior panel help to minimize linear translation during rotation of the door. Accordingly, the hinge performance may be more robust at facilitating rotation. Additionally, the panel embodiments described herein can help save manufacturing time and reduce development tuning costs.

Figure 1:
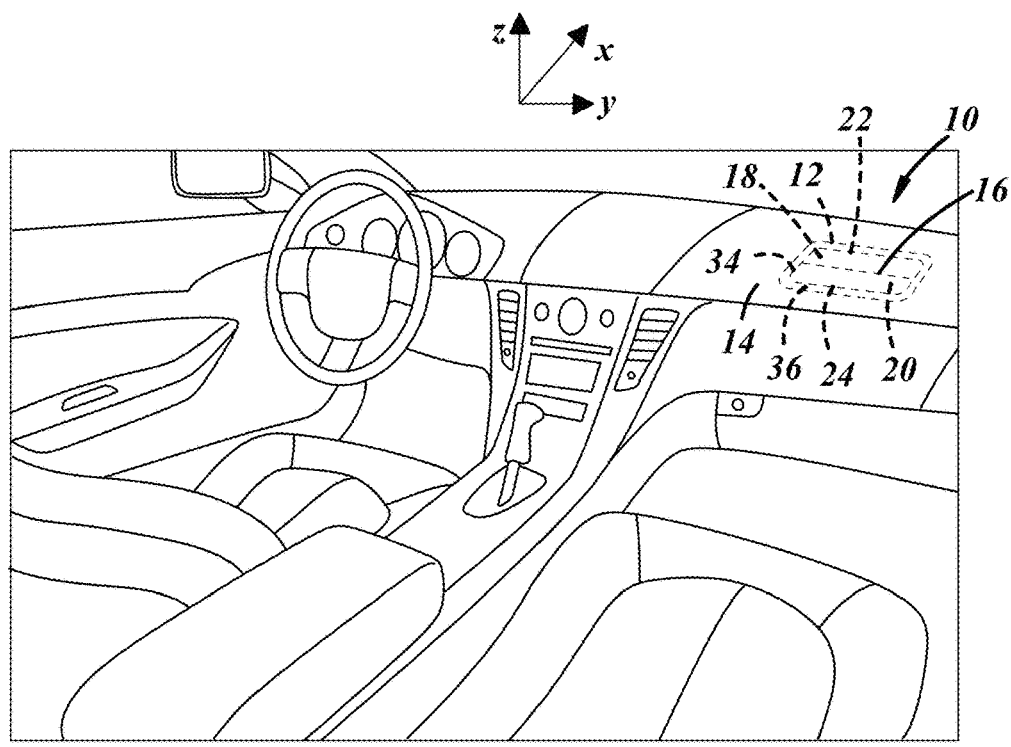
FIG. 1 is a perspective view of a portion of a vehicle interior panel configured to split along a tear seam during deployment of an underlying airbag.
Figure 2:
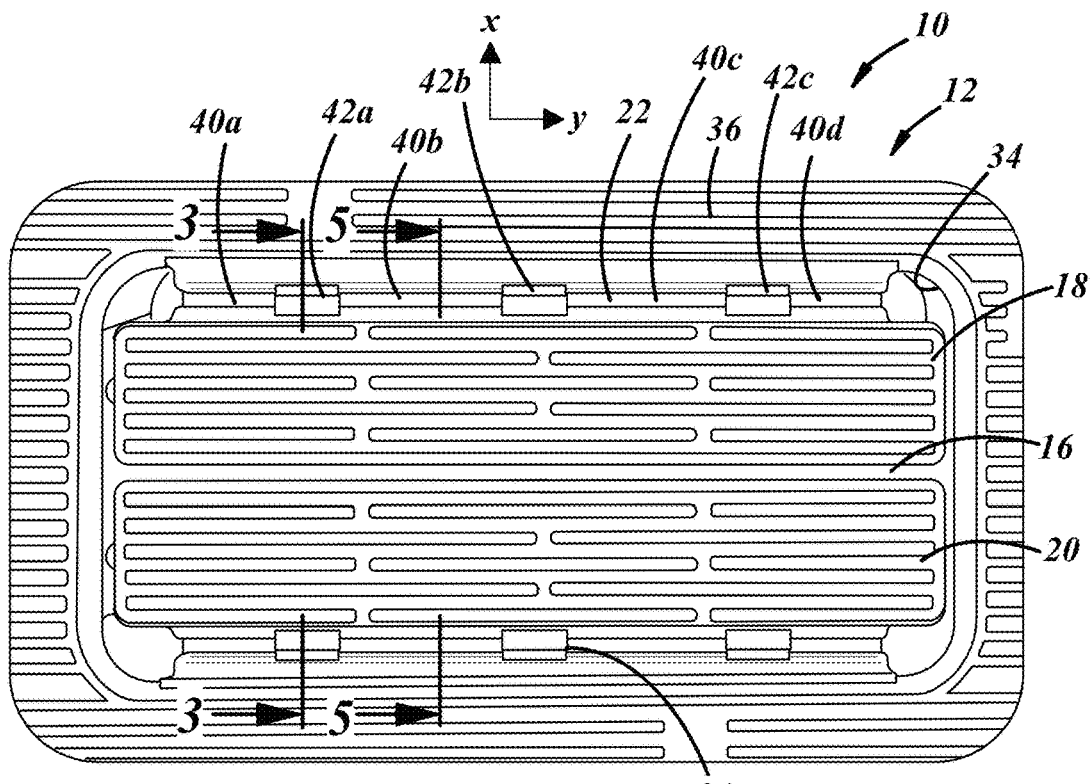
FIG. 2 is a top view of the substrate of the vehicle interior panel of FIG. 1, illustrating a configuration of the panel before deployment.

FIGS. 1 and 2 show a vehicle interior panel 10 for use over a deployable airbag. The illustrated panel 10 is intended for use on the passenger side of a vehicle instrument panel as illustrated in FIG. 1, but the following description is applicable to any vehicle interior panel, such as that of a vehicle door, steering wheel, console, roof, pillar, seat, etc. The panel 10 includes an underlying substrate 12 and a decorative covering 14. FIG. 1 also shows in dotted lines a tear seam 16 that separates two doors 18, 20 which bend and selectively break at corresponding hinge regions 22, 24 upon deployment of the airbag and splitting of the tear seam. FIG. 2 shows the substrate 12 without the decorative covering 14. It is feasible for the panel 10 and the doors 18, 20 to be alternately configured beyond that which is explicitly illustrated. For example, instead of having the tear seam 16 angled to help avoid the door 20 from contacting the windshield, the tear seam could be straight across or have a different shape.

The substrate 12 provides the overall size and shape of the panel 10 and is sufficiently rigid to maintain its shape in a vehicle interior. Example substrates are made from, or include, injection molded materials such as semi-rigid thermoplastic materials (e.g., filled or unfilled polyolefins or thermoplastic elastomers) having a nominal thickness in a range from 1.0 mm to 4.0 mm. As will be detailed below, in an advantageous embodiment, the substrate 12 has strategically located thickness zones to help improve deployment performance.

The decorative covering 14 provides the panel 10 with a desired aesthetic and may be a multilayer component including an outer decorative layer (e.g., leather, simulated leather, fabric, etc.) that faces the interior of the passenger cabin of the vehicle when installed and one or more underlying layers, such as an elastic foam layer that provides the panel with a cushion-like character. The covering 14 can be provided as a one-piece upholstery-like component separately from the substrate 12 and then attached to the substrate, or a portion of the covering such as a foam layer can be formed in place between the decorative layer and the substrate during assembly of the panel 10. The covering 14 can be a simpler decorative layer, such as a single layer of paint or film, or more complex layer, such as a touch sensitive or illuminated thin film device, to cite a few examples.

FIGS. 2-6 show the panel 10 and more particularly, the substrate 12 with the decorative covering 14 not shown. In this example, a deployable airbag 26 is housed in a canister 28 beneath the substrate 12 and adjacent to a chute 30. The airbag 26 is in a deflated state and configured to inflate in a vehicle collision, and the chute 30 restricts airbag inflation to a direction toward the passenger cabin. The chute 30 may be integrally formed as one injection-molded piece with the substrate 12, as shown. Alternatively, the chute 30 may be formed separately from the substrate 12 and can be attached to an inner side of the substrate via a flange or some other attachment mechanism. The chute 30 is generally comprised of a chute wall 32 that extends in a primarily Z direction down from an edge 34 of an outer perimeter 36 that surrounds each door 18, 20. As used herein, extending in a particular direction generally means that a longest extent of the referenced panel portion primarily extends in said direction, or about +/−15° with respect thereto. Consequently, in the illustrated embodiment, the chute wall 32 extends primarily in the Z-direction and the doors 18, 20 along with the outer perimeter 36 extend primarily in the Y-direction. However, this directionality will change accordingly when the panel 10 is used in alternate locations such as a door panel or with a knee airbag, to cite a few examples.

The panel 10 includes a tear seam 16 formed in the substrate 12 and a hinge region 22, 24 on either side of each door 18, 20. In the illustrated examples, the tear seam 16 is a gap, and in some embodiments, may alternately include a reduced thickness area which is thinner than a nominal thickness area 38 at other non-ribbed areas along the substrate 12. Further, the tear seam 16 may not have a noticeable structure until the airbag is deployed. In such an embodiment, the tear seam 16 may be an area in the substrate 12 where one or more airbag doors 18, 20 are configured to be formed. Airbag inflation forces are concentrated at much higher stresses near the tear seam 16 than away from the tear seam so that the substrate 12 splits along the tear seam during airbag deployment to form airbag doors 18, 20 on either side of the tear seam. Different tear seam shapes, such as U-shaped, H-shaped, X-shaped, Y-shaped, or curvilinear shapes are also possible. An X-shaped tear seam, for example, may be used to form four triangular airbag doors with their apexes at the center of the X-shape, for example. One or more layers of the covering 14 may include a tear seam as well.

In the illustrated embodiment, each hinge region 22, 24 is located opposite the tear seam 16 and is configured to promote a particular bend-break profile during deployment. Emphasis herein relates to the hinge region 22, but it should be understood that the teachings relating to the hinge region 22 are also applicable to the hinge region 24. In this embodiment, the hinge regions 22, 24 are symmetrical, but it is possible for them to be structurally different. For example, it may be more advantageous to tether the door 18 that is closer to the windshield more than the door 20, which could also alter the deployment trajectory.

The hinge region 22 comprises a plurality of alternating curved portions 40a, 40b, 40c, 40d and flatter portions 42a, 42b, 42c. In this embodiment, each flatter portion 42 is surrounded by two curved portions 40. In this embodiment, a narrow slot or gap is included between each curved and flatter portion 40, 42. The length and the number of each of the curved and flatter portions 40, 42 may vary from what is particularly illustrated. For example, more portions 40, 42 may be necessary with a larger sized airbag door and/or a larger hinge region. In this embodiment, the length of each curved portion 40 is about twice as long as the length of each flatter portion 42, which can help provide a better tether. The alternating curved and flatter portions 40, 42 provide a more desirable bend-break profile, as the curved portions 40 serve to tether the door 18 and the flatter portions 42 are configured to break in a strategic region to improve rotation and minimize linear translation of the door during deployment.

Figure 3:
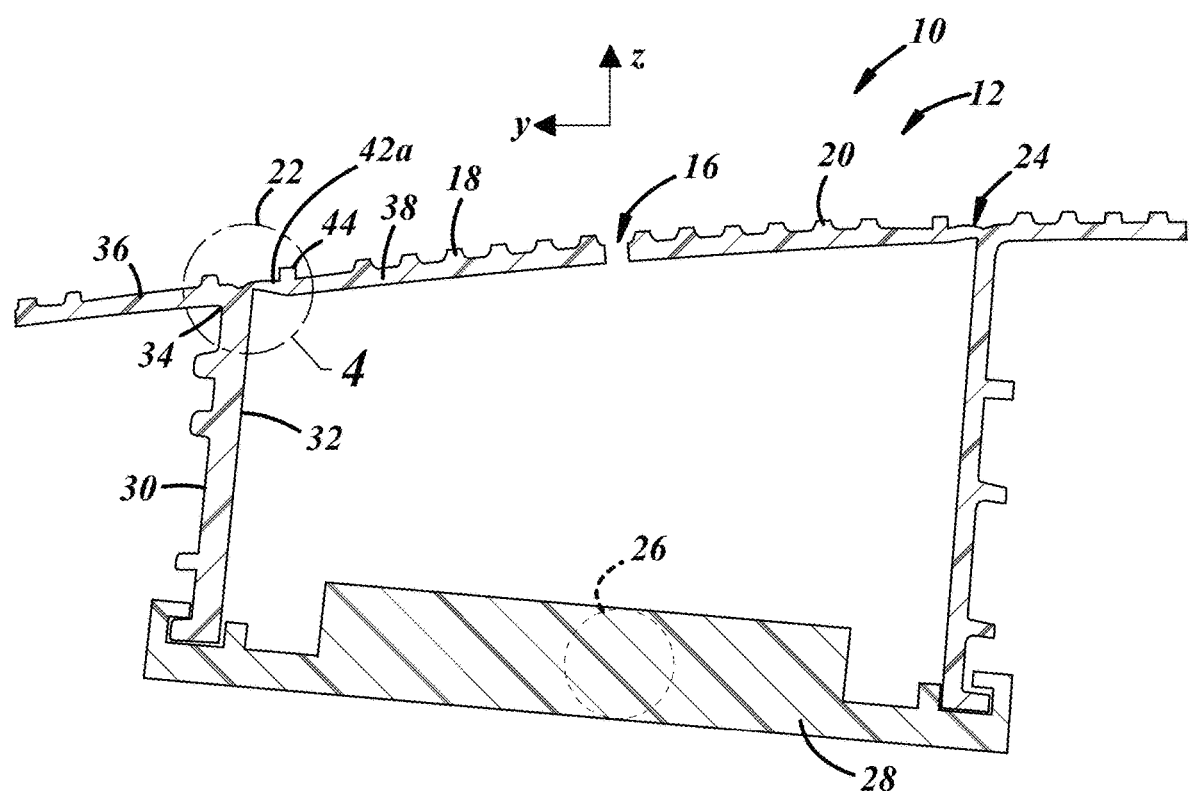
FIG. 3 is a cross-sectional view of the vehicle interior panel of FIGS. 1 and 2 taken along line 3-3 in FIG. 2.
Figure 4:
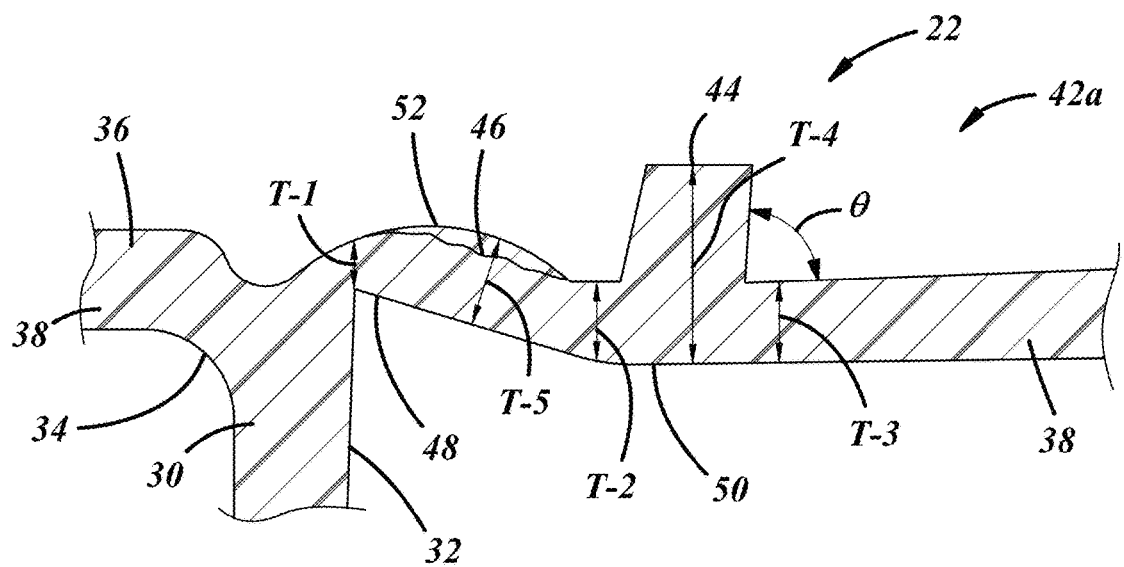
FIG. 4 is an enlarged portion of the cross-sectional view of FIG. 3.

With reference to FIGS. 3 and 4, there is shown an example flatter portion 42a. Teachings with respect to the flatter portion 42a may also be applicable to the other flatter portions 42b, 42c as well. Unlike the curved portions 40, the flatter portions 42 do not have a significant S-curve or U-curve, as illustrated. With the exception of a raised rib 44 and a reinforcement weld 46, the flatter portions 42 generally have more of an angled/planar configuration, which is distinguishable from the curved portions 40 illustrated in FIGS. 5 and 6. Each flatter portion 42 includes a first thickness zone 48 having a first thickness T-1 and a second thickness zone 50 having a second thickness T-2 (each thickness extending between an inner side of the substrate 12 (facing the cannister 28) and an outer or outboard side facing toward the vehicle cabin). To help minimize linear translation of the door 18, the second thickness T-2 is greater than the first thickness T-1. This arrangement puts the thinnest part of each flatter portion 42 directly at the outer perimeter 36 and directly adjacent the chute wall 32. Unlike other configurations in which the thickness is consistent or the thinnest portion is spaced at a distance from the outer perimeter and chute wall, with the present arrangement, the zone 48 with the greatest thickness reduction is located directly against the chute wall 32.

The first thickness zone 48 is located against the outer perimeter 36, and is preferably in an area that extends less than 2 mm from the chute wall 32, and more preferably, in an area that extends less than 1 mm from the chute wall. The second thickness zone 50 may extend between the first thickness zone 48 and the nominal thickness area 38. In an advantageous embodiment, within each zone 48, 50, the thickness T-1, T-2 is measured at its smallest extent, as illustrated. In this particular implementation, the thickness T-1 is about 1.34 mm and the thickness T-2 is about 1.86 mm. Further, both T-1 and T-2 are smaller than a third thickness T-3 taken at the nominal thickness area 38, which is about 2.50 mm. The thickness T-3 at the nominal thickness area 38 is taken directly adjacent to the raised rib 44, on the tear seam 16 side. These thickness values may vary depending on a number of factors, such as the overall configuration of the panel 10, the material of the doors 18, 20, parameters relating to the airbag 26 and canister 28, to cite a few examples. In an advantageous embodiment, a ratio of the first thickness T-1 to the second thickness T-2 is 1:1.3 or more. Preferably, the ratio of T-1 to T-2 is between 1:1.3 and 1:1.9, inclusive. This change in thickness, along with locating the first thickness zone 48 directly at the chute wall 32, promotes breakage of each flatter portion 42 and helps minimize linear translation during rotation.

As shown in FIG. 4, the second thickness zone 50 includes a raised rib 44. In this particular implementation, a thickness T-4 at the raised rib 44 is about 4-6 mm. The raised rib 44 can help concentrate forces closer to the first thickness zone 48 and the chute wall 32 to help promote breakage. In some embodiments, the raised rib 44 makes up the entirety of the second thickness zone 50, such that the ratio of T-1 to T-2 is about 1:4.5. Accordingly, in at least some implementations, an advantageous ratio of T-1 to T-2 is between 1:1.3 and 1:4.5, inclusive, which can help improve force concentration characteristics. One or more sides of the raised rib 44 in the illustrated embodiments include a draft angle $\theta$ such that the raised rib slopes towards the tear seam 16. The draft angle $\theta$ in this embodiment is about 7° but may be about 5-15°. This arrangement can help during manufacturing. The slope may be included on both sides of the raised rib 44 or on any one side feasible for demolding. The raised rib 44, along with the other reinforcement ribs along the doors 18, 20, may be welded on, integrally molded, or otherwise attached.

In the illustrated embodiment, a reinforcement weld 46 is located at the first thickness zone 48, and there is an intermediate zone 52 located between the first thickness zone and the second thickness zone 50. The intermediate zone 52 has a thickness T-5 that is greater than both the first and second thicknesses T-1 and T-2. This may be at least partially attributable to the reinforcement weld 46, or in some embodiments, the weld may not be included and the intermediate zone 52 may be integrally molded or otherwise formed in the flatter portion 42. Additionally, some embodiments may not have an intermediate zone 52 and instead the thickness may increase rather consistently from the first thickness zone 48 to the second thickness zone 50. The intermediate zone 52, however, can help create a larger thickness transition to help concentrate forces at the first thickness zone 48. This can help promote rotation of the door 18 directly at the chute wall 32. This abutment of the thinnest portion at the first thickness zone 48 with the chute wall 32 can help minimize linear translation of the door 18, which may be more likely when the axis of rotation is further spaced from the chute wall. Additionally, this can help promote breakage at the chute wall 32.

Figure 5:
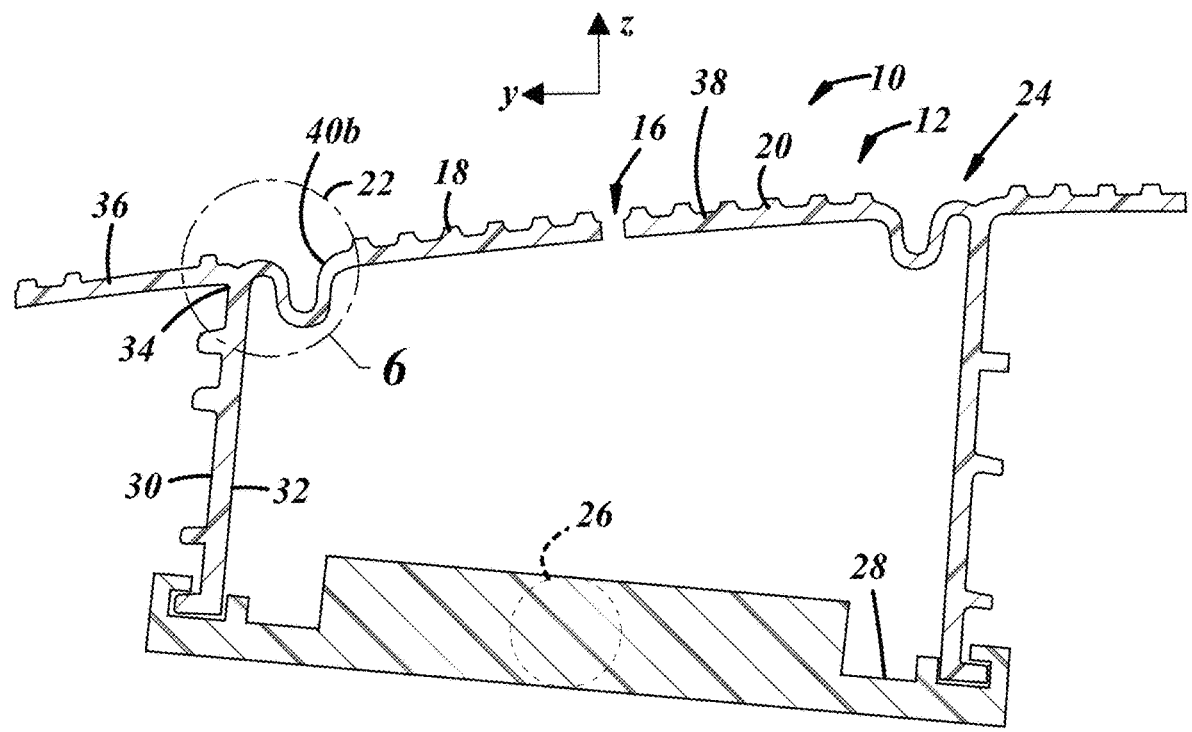
FIG. 5 is a cross-sectional view of the vehicle interior panel of FIGS. 1 and 2 taken along line 5-5 in FIG. 2.
Figure 6:
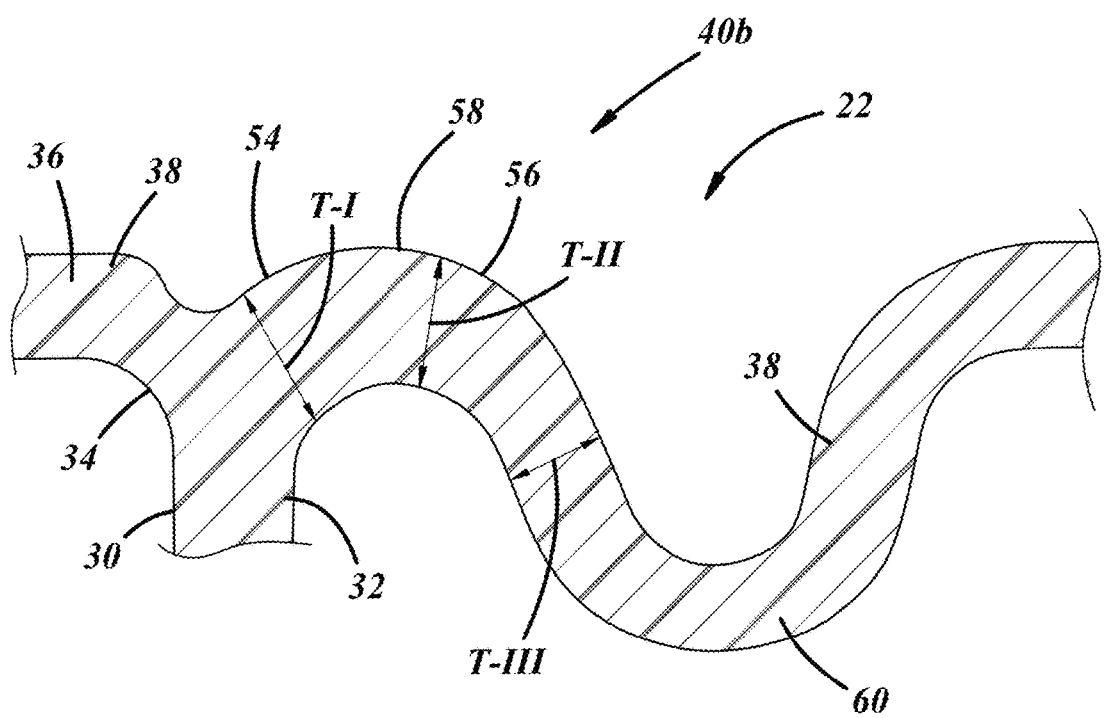
FIG. 6 is an enlarged portion of the cross-sectional view of FIG. 5.

FIGS. 5 and 6 are cross-sectional views of the curved portion 40b. The teachings relating to the curved portion 40b may also be applicable to the other curved portions 40a, 40c, 40d as well. The curved portions 40 in the present embodiment are also strategically structured with a particular thickness profile that can encourage improved door 18 deployment. The curved portion 40 has a first thickness zone 54 having a first thickness T-I and a second thickness zone 56 having a second thickness T-II. Opposite from the flatter portions 42, with the curved portions 40, the first thickness T-I is greater than the second thickness T-II. This can help add more structural integrity directly adjacent to the chute wall 32 at the outer perimeter 36, which may improve the tethering effect of the curved portions 40. The curved portions 40 in the illustrated embodiment also include a third thickness T-III which is advantageously equal to the nominal thickness T-3. The thickness T-III is less than T-II and less than T-I such that the thickness gradually reduces from the first thickness zone 54, through the second thickness zone 56. In the illustrated embodiment, the thickness T-I is between about 3.2-4.0 mm, and the thickness T-II is between about 2.5-3.2 mm. The thickness T-III is about 2.5 mm, but as previously mentioned, these particular values may change depending on the desired specifications for the panel 10.

With the curved portions 40, the first thickness zone 54 is located directly adjacent the chute wall 32. Additionally, given the thickness maximization at the chute wall 32 (as opposed to the thickness minimization with the flatter portions 42), each thickness T-I, T-II is taken at its largest extent within each zone 54, 56. In the illustrated embodiment, the thickness T-I is gradually reduced within the first U-shape section 58 until the thickness T-III, and then the thickness is consistent for the second U-shape section 60 of the curved portion 40. Accordingly, this embodiment has a first, variable thickness U-shape section 58 which starts at the chute wall 32 and outer perimeter 36, and a second, constant thickness U-shape section 60 which extends between the first U-shape section and the main body of the door 18, with the U-shape sections 58, 60 opening in opposite directions. In the illustrated embodiment, a ratio of the first thickness T-I to the second thickness T-II is about 1:0.8, but this may vary slightly.

It is to be understood that the foregoing is a description of one or more embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "e.g.," "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation. In addition, the term "and/or" is to be construed as an inclusive OR. Therefore, for example, the phrase "A, B, and/or C" is to be interpreted as covering all the following: "A"; "B"; "C"; "A and B"; "A and C"; "B and C"; and "A, B, and C."

The invention claimed is:

1. A vehicle interior panel for use over a deployable airbag, the panel comprising:
    a substrate comprising a door and an outer perimeter at least partially surrounding the door, wherein a hinge region is located at least partially between the door and the outer perimeter, the hinge region comprising:
two curved portions spanning at least partially between the door and the outer perimeter; and
a flatter portion located at least partially between the two curved portions, the flatter portion having a first thickness zone having a first thickness coupled to and abutting the outer perimeter and a second thickness zone having a second thickness located between the first thickness zone and the door, wherein the second thickness is greater than the first thickness.

2. The vehicle interior panel of claim 1, comprising a chute wall extending from an edge of the outer perimeter.

3. The vehicle interior panel of claim 2, wherein the first thickness zone is directly adjacent the chute wall.

4. The vehicle interior panel of claim 2, wherein the door is configured to rotate directly at the chute wall.

5. The vehicle interior panel of claim 4, wherein the flatter portion and the chute wall minimize linear translation of the door during deployment.

6. The vehicle interior panel of claim 1, wherein at least one of the curved portions includes a first thickness zone having a first thickness and a second thickness zone having a second thickness, wherein the first thickness is greater than the second thickness.

7. The vehicle interior panel of claim 6, wherein the first thickness zone of the flatter portion and the first thickness zone of the at least one curved portion are directly adjacent a chute wall.

8. The vehicle interior panel of claim 1, wherein the second thickness zone has a raised rib.

9. The vehicle interior panel of claim 8, wherein one or more sides of the raised rib have a draft angle that is sloped toward a tear seam of the door.

10. The vehicle interior panel of claim 8, wherein a ratio of the first thickness of the flatter portion to the second thickness of the flatter portion is between 1:1.3 and 1:4.5, inclusive.

11. The vehicle interior panel of claim 8, wherein the flatter portion includes an intermediate zone having an intermediate thickness, wherein the intermediate thickness is greater than a thickness directly adjacent to the raised rib and less than the second thickness at the raised rib.

12. The vehicle interior panel of claim 11, wherein the first thickness is less than the intermediate thickness and the thickness directly adjacent to the raised rib.

13. The vehicle interior panel of claim 1, wherein a ratio of the first thickness of the flatter portion to the second thickness of the flatter portion is 1:1.3 or more.

14. The vehicle interior panel of claim 1, wherein a ratio of the first thickness of the flatter portion to the second thickness of the flatter portion is 1:4.5 or less.

15. The vehicle interior panel of claim 1, wherein the flatter portion has a reinforcement weld at the first thickness zone.

16. A vehicle interior panel for use over a deployable airbag, the panel comprising:
a substrate comprising a door and an outer perimeter at least partially surrounding the door, wherein a hinge region is located at least partially between the door and the outer perimeter, the hinge region comprising:
two curved portions spanning at least partially between the door and the outer perimeter; and
a flatter portion located at least partially between the two curved portions, the flatter portion having a first thickness zone having a first thickness coupled to and abutting the outer perimeter and a second thickness zone having a second thickness located between the first thickness zone and the door, wherein the second thickness is greater than the first thickness, wherein a ratio of the first thickness of the flatter portion to the second thickness of the flatter portion is between 1:1.3 and 1:1.9, inclusive.

* * * * *